United States Patent

[11] 3,570,805

[72] Inventors Harold J. Moran
Trenton;
Vincent F. Siravo, New Monmouth, N.J.
[21] Appl. No. 795,532
[22] Filed Jan. 31, 1969
[45] Patented Mar. 16, 1971
[73] Assignee Switlik Parachute Company Inc.
Trenton, N.J.

[54] VALVE HAVING QUICK RELEASE FLUID PRESSURE VALVE CLOSING MEANS
4 Claims, 4 Drawing Figs.
[52] U.S. Cl............................................. 251/38, 251/44, 251/294
[51] Int. Cl........................................... F16k 31/383
[50] Field of Search.......................... 251/38, 41, 75, 44, 294, 66

[56] References Cited
UNITED STATES PATENTS
2,633,141 3/1953 Russell .................. 251/294x
3,073,301 1/1963 Hay et al.................. 251/294x
3,204,926 9/1965 Wismar.................... 251/44x FOREIGN PATENTS
973,914 11/1964 Great Britain................ 251/38

Primary Examiner—Arnold Rosenthal
Attorney—Sperry and Zoda

ABSTRACT: A high-pressure valve structure to control admission of fluid from a high-pressure reservoir to an inflatable article, the said valve structure having a valve element maintained in its seated closed position to prevent leakage and fluid admission to the article by the high fluid pressure existing in the reservoir. Readily accessible manually operable valve release means are provided suddenly to release fluid seating pressure acting on the valve element and substantially instantaneously to permit admission of fluid from the reservoir to the article. The manually operable valve release mean is, preferably, operated by a pull on a lanyard, the latter serving to open the valve when pulled in any direction radially and axially, or either, of the axis of the valve structure. Actuation of the manually operable valve release means does not alter the external dimensions of the valve structure, which is an important feature of the invention as space is at a premium when the valve structure is to be installed in aircraft or, possibly, in space environment vehicles for inflation of emergency equipment such as, for example, a life raft or an escape chute.

PATENTED MAR 16 1971
3,570,805
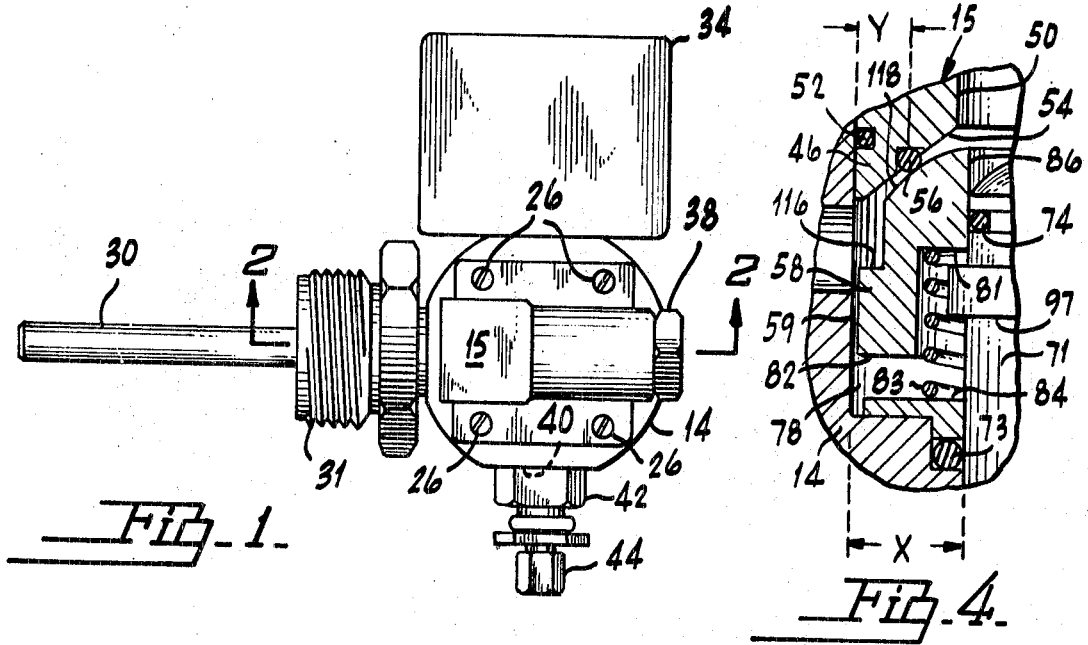
Fig. 1.
Fig. 4.
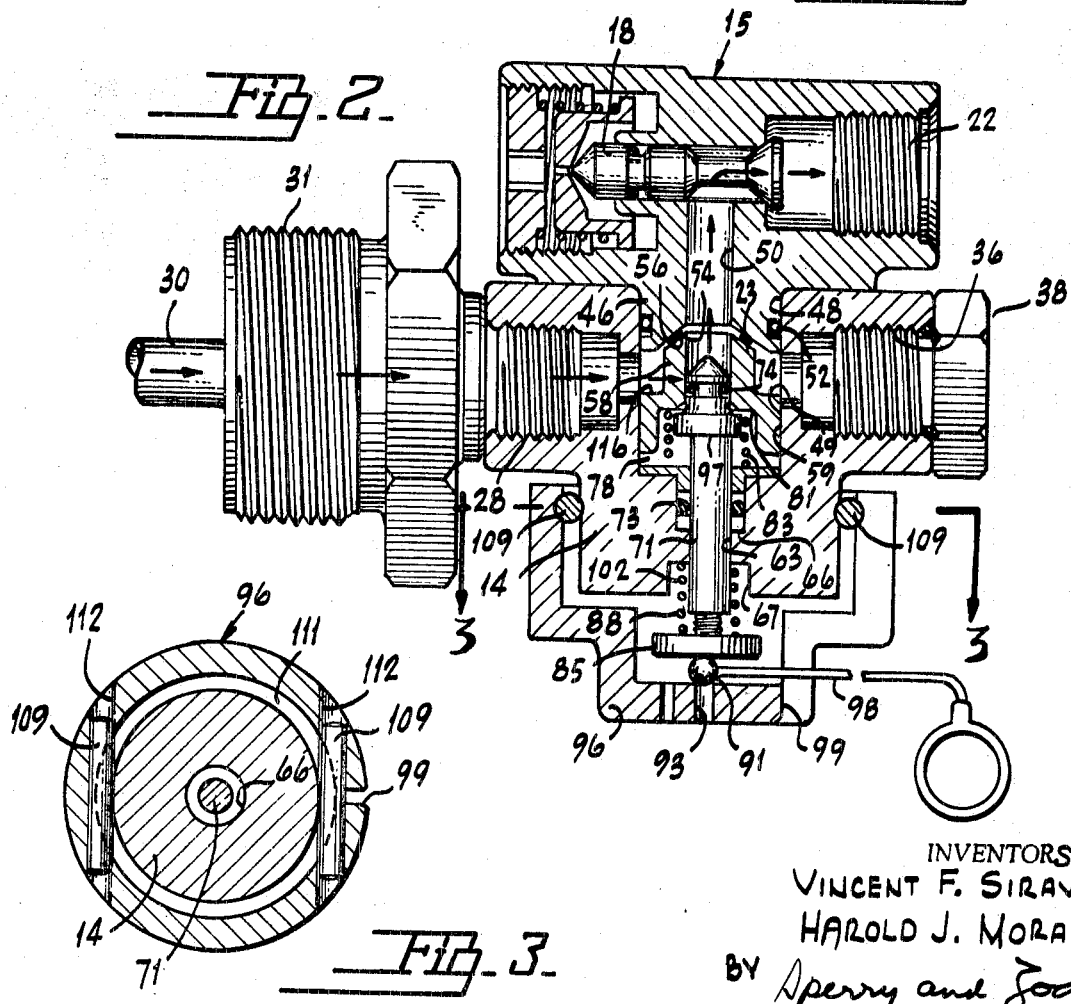
Fig. 2.
Fig. 3.
INVENTORS
VINCENT F. SIRAVO &
HAROLD J. MORAN
BY Sperry and Zoda
ATTORNEYS 3,570,805

VALVE HAVING QUICK RELEASE FLUID PRESSURE VALVE CLOSING MEANS

BACKGROUND OF THE INVENTION

1. Field of the Invention

This invention relates to valves, and more particularly to a quick acting valve having manually operable valve opening means especially suited to control admission of fluid under pressure to an inflatable article from a fluid pressure reservoir containing fluid under very high static fluid pressure, the high fluid pressure serving to maintain the valve in closed position until the manually operable means is used to substantially instantaneously establish communication from the reservoir to the article. The external dimensions of the valve are maintained at all times to prevent obstruction of its operation.

2. Description of the Prior Art

Previous valves, used in the field to which this invention is especially applicable, relied on mechanically produced movement of an internal valve element from its closed position against a valve seat. This closed position was maintained by a mechanically applied force, usually a spring. Other previous valves relied on a force exerted by fluid pressure and an opposed mechanically exerted force to fix the position of a valve element.

The prior art does not disclose nor suggest a valve in which the valve is both opened and closed by fluid pressure emanating from the same source and entering the valve through the inlet.

SUMMARY OF THE INVENTION

In accordance with the present invention, a valve is provided to be interposed between a higher pressure fluid reservoir and an article to receive fluid under pressure, the valve having a fluid flow control element which is moved from its closed position to its open position by fluid under high static pressure existing in a storage reservoir thereby insuring a standby condition without leakage, but enabling substantially instantaneous communication between the storage reservoir and the article whereby the article receives a quantity of the fluid under a suitable applied pressure.

BRIEF DESCRIPTION OF THE DRAWING

FIG. 1 is a top plan view of a valve embodying the invention;

FIG. 2 is a view in sectional elevation, the section being taken on line 2-2 of FIG. 1 as reviewed in the direction of the arrows;

FIG. 3 is a transverse section through the body and through a rotatable cover serving as a portion of the manually operable means for opening the valve; taken substantially on line 3-3 of FIG. 2, on a scale slightly reduced below that of FIG. 2; and FIG. 4 is an enlarged fragmentary section on the same cutting plane as FIG. 2.

DESCRIPTION OF THE PREFERRED EMBODIMENT

Referring for the present to FIG. 1 of the drawing, the valve structure comprises a valve body or housing 14 surmounted by a fitting 15 provided with a poppet-type pressure reducing valve 18 of a known kind and an internally threaded outlet port 22. The port 22 provides a connection for a suitable conduit leading to an inflatable article (neither shown). Four machine screws 26 connect the housing 14 and the fitting 15. The housing 14 has a threaded inlet port 28 to receive an inlet tube 30 extending from a pressure bottle fitting 31 which receives the mouth of a pressure bottle (not shown) or any other similar high pressure reservoir. The pressure bottle is filled with dry air, nitrogen or other suitable gas under pressure. This pressure is in the neighborhood of 3.000 lbs. p.s.i.g. for the indicated use of the invention. A second threaded port (not appearing on the drawing) is shown as receiving a protective casing 34 for a pressure gauge (not shown). A third threaded port 36, similar to the first and second described threaded ports, is shown as receiving a rupture plug 38 designed to rupture whenever pressure becomes excessive to afford relief. A fourth threaded port 40, similar to the others, is shown as receiving a fitting 42 into which is threaded a filler connection or valve 44.

The four threaded ports have identical inside diameters and thread pitch so that the rupture plug 38, gauge casing 34, fitting 31 and the filler connection or valve 44 can be connected to the housing 14 in any arrangement or position desired, according to the particular installation requirements.

A cylindrical boss 46 extends from the fitting 15 into the enlarged end 48 of a main bore 49 in the valve housing 14. A gasket or packing 52 received in a groove in the boss prevents leakage and complements the fluid confining effect of the fit between the housing 14 and the fitting 15 when the machine screws are tightened. A main gasketed valve seat 54 is formed on the inner end of the boss 46, the valve contacting portion of the gasketed seat being provided by an O-ring 56.

An axially movable main valve element 58 is slidably received at 59 in the enlarged end of the bore 49. The main bore 49 has a constricted guide portion 63 between two portions 66 and 67 of enlarged diameter. A pilot stem 71 serves as a part of the valve release mechanism in a manner to be explained and is guided by the constricted guide portion 63 of the main bore 49. Seals for the pilot stem are provided at 73 and 74.

The slidable fit at 59 between the main valve element 58 and the enlarged end of the bore 49 constitutes a space through which fluid from the pressure bottle fitting flows into the cavity 78 in the back of the valve element. Pressure is thereby exerted against a shoulder 81 defined by a counterbore formed in the element 58, and is also exerted against the back surface 82 of the element, causing the element to be tightly seated under high pressure against the O-ring 56. The main valve element 58 is biased by a spring 83 to a seated position in which a frustoconical head end 23 of said element engages against the O-ring seat 56. This spring serves only to initially seat the main valve element 58. The main valve element 58 is held tightly in sealing engagement against its seat by fluid pressure conveyed to it as described in the immediately foregoing.

As mentioned above, the pilot stem 71 is part of the valve release mechanism and to serve this purpose a disclike member 85 has a threaded rod 88 adjustably received in the end of the pilot stem 71. The member 85 bears against a ball 91 seated in a center opening 93 in a cap 96. Adjustment of rod 88 in stem 71 in turn adjusts the spacing of a stop collar 97 of the stem in respect to shoulder 81. A cord or lanyard 98 extends outwardly of the cap through an axial slot 99 in the rim of the cap 96. The cap 96 is mounted on the housing 14 so that it is free to rotate. This may be accomplished (See FIG. 3) by pins 109 extending within bores 112 of the cap to be received in a continuous groove 111 of housing 14.

In the several FIGS. of the drawing, the various components are illustrated as they would appear while the device is awaiting use. Initially, valve element 58 is biased to the position thereof shown in FIGS. 2 and 4, that is, to its seated position, by compression spring 83. As noted previously herein, however, the spring has the function only of initially seating the main valve element in contact with gasket 56 provided in the valve seat 54 intermediate the inner and outer annular edges of the valve seat.

It may be observed at this point that spring 83 at one end bears against shoulder 81, while at its other end the spring bears against an embossed disc 84 seating in a counterbore of housing 14, within which counterbore O-ring 73 is confined.

In the circumstances, pilot stem 71 is disposed in position to seal axial passage 86 of valve element 58 against the passage of pressure fluid therethrough. It may also be noted that in this position of the parts, stop collar 97 is distinctly spaced from shoulder 81 of the valve element.

Compression spring 102 interposed between housing 14 and member 85 of the pilot stem, is tensioned to bias the pilot stem downwardly in FIGS. 2 and 4 to a position in which it clears the axial passage 86 to permit the passage of the pressure fluid therethrough. The movement of the valve stem to its passage-opening position is accomplished by a pull upon the lanyard 98, which pull can be exerted in any direction radially of the pilot stem, since the cap 96 swivels as necessary for this purpose. Or, the pull can be exerted longitudinally of the pilot stem, with the cap 96 again swiveling as necessary according to the line along which the pulling force is exerted upon the lanyard.

In any event, upon such pull on the lanyard, ball 91 is caused to move radially from its seated position shown in FIG. 2, so as to no longer be interposed between member 85 and the end wall of the cap. Spring 102 is thus permitted to expand, biasing the pilot stem member 85 into engagement with the adjacent end wall of cap 96 whereby to cause axial passage 86 of the valve element to be opened.

It may be noted at this point that after spring 83 initially seats valve element 58, the fluid under pressure is admitted. As noted previously herein, said fluid enters cavity 78 due to the loose fit 59 of valve element 58 in housing 14. The pressure fluid in cavity 78 exerts pressure against the back of the valve element, tending to bias it against seat gasket 56. This pressure against the back of the valve element is exerted over the full radial distance X indicated in FIG. 4, that is, said pressure against the back of the valve element is exerted over the full area, throughout the circumference of the valve element, represented by shoulder 81 and end surface 82 of the valve element. Said pressure, also as previously noted herein, is on the order of 3.000 p.s.i.g. in a typical embodiment of the invention.

It may further be noted that under these conditions, the pressure fluid is also exerting an opposing pressure, against shoulder 116 provided on the forward surface of the valve element, and the tapered end surface 118 of the valve element. This pressure, however, is limited to the radial distance Y which is the difference between the radii of O-ring 56 and the outer circumference of the valve element.

The pressure area denoted by surfaces 116, 118 is thus appreciably less than the area represented by surfaces 81, 82. Therefore, since this pressure is far greater at the back of the valve element, the valve element is biased by the pressure of the gas under pressure to a position in which it is tightly, sealably engaged against gasket 56.

When the lanyard is pulled, the opening of the axial passage 86 of the valve element causes the pressure against said element, occurring within cavity 78, to be lost instantaneously through passage 86. As a result, with zero pressure now existing at the back of the valve element, and with pressure still being maintained against surfaces 116, 118 by the pressure fluid, said pressure over the area Y instantaneously unseats the valve, so that the pressure fluid is now free to flow directly from the bottle or other source through passage 50 into the article to be inflated.

We claim:

1. A valve structure comprising; a valve housing having inlet means to receive fluid under pressure, outlet means adapted for connection to a fluid receiver, said housing having a fluid conveying bore interposed between said inlet means and said outlet means, main valve means movable in said bore from a valve closing position to a valve opening position, means operable to maintain said main valve means in said valve closing position by fluid under static pressure from said inlet means, valve opening means, manually operable control means for said valve opening means, and means whereby upon operation of said manually operable control means, fluid under pressure from said inlet means is applied to move said valve means substantially instantaneously from said valve closing position to said valve opening position, said manually operable control means comprising a pilot stem received in said main valve member to be axially movable in said bore, an adjustable extension on said pilot stem, a cap covering said housing opposite said inlet means, and a ball interposed between said cap and said adjustable extension.

2. A valve structure as in claim 1 wherein said cap is freely rotatable on said housing, a lanyard connected to said ball, said cap having a slot through which said lanyard extends, and said slot permitting said lanyard to be pulled axially of said housing.

3. A valve structure comprising a valve housing having inlet means to receive fluid under pressure and outlet means adapted for connection to a fluid receiver, said housing having a fluid conveying bore interposed between said inlet means and said outlet means, a valve seat in said bore adjacent said outlet means, a valve member having slidable contact with said bore to be movable in said bore from a valve opening position to a valve closing position against said seat, a spring tending to move said valve member against said seat, said valve member having means to receive fluid under pressure introduced against said last named means by way of said slidable contact between said valve member and said bore to force said valve to be maintained in valve closing position, a central bore in said valve member, a pilot stem projecting into said bore to close said bore to passage of fluid, a second spring, a member rotatably received by said housing, and a lanyard operated ball member interposed between said rotatable member and said pilot stem to keep said pilot stem in passage closing position, removal of said ball member by said lanyard permitting said second spring to move said pilot stem to open said central bore in said valve member whereby to remove fluid pressure closing force from said valve member so as to be applied as a force to move said valve member substantially instantaneously to valve opening position.

4. A valve comprising: a housing having an inlet and outlet connectable to a fluid pressure source and receiver respectively; and a bore communicating between the inlet and outlet; a valve element movable in the bore between valve-closing, seated position and a valve-opening, unseated position and having a passage communicating with the outlet, said element including back and front surfaces exposed to the pressure fluid within the bore and incorporating a pressure differential in which the pressure against the back surface exceeds that against the front surface to an extend effective to normally seat the element; a stem extending into and normally closing the passage; means responding to a force which in respect to the stem is exerted by a user from any location taken about the full 360° circumference of the stem in any of a radial direction, a longitudinal direction, or a direction having both radial and longitudinal components to release the stem for movement to a passage-opening position in which the bore is vented to the receiver and reverses the pressure differential so as to unseat the element under pressure exerted against the front surface thereof; and a cap swivelly mounted on the housing for rotation through a full 360°, said stem-releasing means including a spacer element and a lanyard, the spacer element being normally interposed between the cap and stem and movable radially thereof to free the stem for movement to its passage-opening position, said lanyard being connected to the spacer element for moving the same radially of the cap and stem, said lanyard extending out of the cap in position to be pulled by a user in any of said directions in respect to the stem, said spacer element comprising a ball concentric with the cap and stem, at least one of which has a detent normally retaining the ball in its stem-restraining position between the stem and cap.